United States Patent
To et al.

(10) Patent No.: US 10,860,776 B1
(45) Date of Patent: Dec. 8, 2020

(54) PRINTED CIRCUIT BOARD (PCB) MODULAR DESIGN

(71) Applicant: XILINX, INC., San Jose, CA (US)

(72) Inventors: Hing Y. To, Cupertino, CA (US); John J. Rinck, San Jose, CA (US); Juan Wang, Cupertino, CA (US); Maria George, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/436,181

(22) Filed: Jun. 10, 2019

(51) Int. Cl.
| | |
|---|---|
| G06F 30/39 | (2020.01) |
| G06F 30/20 | (2020.01) |
| H05K 3/00 | (2006.01) |
| G06F 30/398 | (2020.01) |
| G06F 30/392 | (2020.01) |
| G06F 30/394 | (2020.01) |

(52) U.S. Cl.
CPC ............ *G06F 30/398* (2020.01); *G06F 30/20* (2020.01); *G06F 30/392* (2020.01); *G06F 30/394* (2020.01); *H05K 3/0005* (2013.01)

(58) Field of Classification Search
CPC ...... G06F 30/20; G06F 30/392; G06F 30/394; H05K 3/0005
USPC .......................................................... 716/137
See application file for complete search history.

(56) References Cited

U.S. PATENT DOCUMENTS

| | | | |
|---|---|---|---|
| 6,587,989 B2 | 7/2003 | Rosenbaum et al. | |
| 7,117,467 B2 | 10/2006 | Ali et al. | |
| 7,409,666 B2 * | 8/2008 | Almeida et al. | G06F 30/39 716/137 |
| 8,875,072 B2 | 10/2014 | Newhard et al. | |
| 9,268,895 B2 * | 2/2016 | Perry et al. | G06F 30/398 |
| 10,423,748 B2 * | 9/2019 | Irissou et al. | G06F 30/392 |
| 10,437,953 B2 * | 10/2019 | Irissou et al. | G06F 30/33 |
| 2006/0116994 A1 * | 6/2006 | Jonker et al. | G06Q 10/04 |

* cited by examiner

*Primary Examiner* — Sun J Lin
(74) *Attorney, Agent, or Firm* — Patterson + Sheridan, LLP

(57) ABSTRACT

Some examples described herein relate to a design system and a method for printed circuit board (PCB) design. In an example, a design system includes a processor and a memory coupled to the processor. The memory stores instruction code. The processor is configured to execute the instruction code to provide a workspace in a user interface in which a PCB design comprising multiple layers is capable of being created; provide a list of layout templates in the user interface; and provide an insert function, via the user interface, configured to insert a selected layout template of the list of layout templates into the workspace to be included in the PCB design. Each layout template of the list of layout templates is a tile layout that includes a layout component and metal lines that extend to one or more edges of the tile layout.

20 Claims, 5 Drawing Sheets

PRINTED CIRCUIT BOARD (PCB) MODULAR DESIGN

TECHNICAL FIELD

This disclosure relates to printed circuit board (PCB) design, and, more particularly, to modular PCB design using layout templates.

BACKGROUND

Printed circuit boards (PCBs) are commonly used as a substrate to mechanically support and electrically interconnect various electrical components, such as integrated circuits (ICs). As the technology of the ICs continues to evolve, including the numbers of solder balls connecting the ICs to the PCB and/or the frequencies of signals propagating through the PCB, layouts of PCBs must correspondingly evolve. Software tools, such as computer-aided design (CAD) tools and electronic design automation (EDA) tools, have been used in designing PCBs. The evolving technology of ICs and rules for a PCB cause PCB design to be a daunting undertaking. Commonly, a PCB design does not comply with applicable design rules for the technology of the ICs.

SUMMARY

Some examples described herein relate to printed circuit board (PCB) design. More specifically, some examples described herein relate to modular PCB design using layout templates. In a processor-based system, a user is provided a list of layout templates, and the user may cause any of the layout templates to be inserted into a PCB design. The user can start with known-good layout templates as a basis for the PCB design, which can simplify the PCB design process by avoiding having to create a design wholly from scratch and by providing confidence that the layout templates are in compliance with applicable design rules. This can, in turn, decrease PCB design time.

In an example, a design system includes a processor and a memory coupled to the processor. The memory stores instruction code. The processor is configured to execute the instruction code to provide a workspace in a user interface in which a PCB design comprising multiple layers is capable of being created; provide a list of layout templates in the user interface; and provide an insert function, via the user interface, configured to insert a selected layout template of the list of layout templates into the workspace to be included in the PCB design. Each layout template of the list of layout templates is a tile layout that includes a layout component and metal lines that extend to one or more edges of the tile layout.

In another example, a design system includes a processor and a memory coupled to the processor. The memory stores instruction code. The processor is configured to execute the instruction code to execute a graphical user interface module, and execute a PCB design module. The PCB design module is operable to access at least one layout template file and to display, via the graphical user interface module, a list comprising at least one layout template corresponding to the at least one layout template file. Each layout template of the list is a tile layout that includes a layout component and metal lines that extend to one or more edges of the tile layout. A selected layout template of the list is capable of being inserted by operation of the PCB design module in a workspace provided by the PCB design module via the graphical user interface module. A PCB design is capable of being created in the workspace using the PCB design module.

A further example is a method for creating a PCB layout. The method uses a processor-based system. A layout workspace is created to create the PCB layout of a PCB. Layout template files are accessed. Each of the layout template files comprises a layout template. Each layout template is a tile layout that includes a layout component and metal lines that extend to one or more edges of the tile layout. A list of layout templates contained in the layout template files is generated. A selected layout template from the list of layout templates is inserted into the layout workspace.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
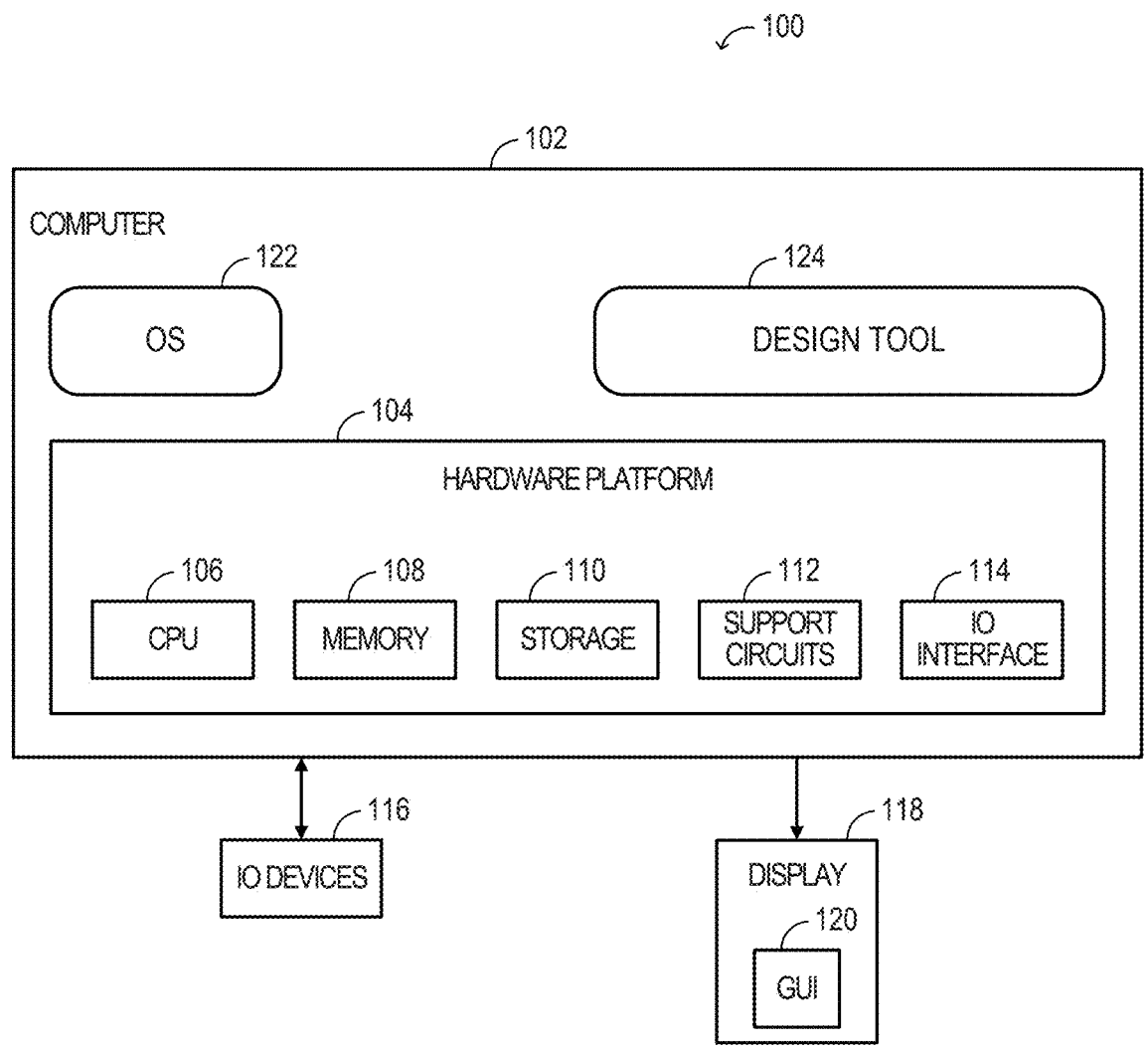
FIG. 1 is a block diagram depicting an example of a design system according to some examples.

Some examples described herein relate to printed circuit board (PCB) design. More specifically, some examples described herein relate to modular PCB design using layout templates. In a processor-based system, a user is provided a list of layout templates, and the user may cause any of the layout templates to be inserted into a PCB design. Each of the layout templates is a tile comprising a layout component (e.g., contact pads for a surface-mount component or through-vias of a through-via mount component) and metal wires connecting at least some of the layout component to an edge of the tile. The tile can address each layer of the PCB design within the tile by including any metal lines, vias, ground planes, power planes, etc., in or through each layer of the PCB design. The layout templates can comply with applicable design rules and may be modified by the user. In simple cases, the user can stitch together nets at edges of tiles of layout templates to complete a PCB design. The user can start with known-good layout templates as a basis for the PCB design, which can simplify the PCB design by avoiding having to create from scratch a similar tile(s) and by providing confidence that the layout templates are in compliance with the design rules. This can, in turn, decrease PCB design time.

A user designing a PCB layout commonly will use a processor-based system (e.g., a computer) that implements a design tool, such as a computer aided design (CAD) tool or an electronic design automation (EDA) tool. A user also will commonly have to read and interpret a vendor's design rules for a PCB when designing a PCB layout that implements that vendor's integrated circuit (IC). Design rules can be ambiguous and subject to different interpretations by different users. Accordingly, designing a PCB that complies with the applicable design rules can be challenging. Additionally, a user may be able to refer to previous PCB designs that implemented a particular IC; however, in doing so, the user commonly carries over any errors or non-compliance with the design rules to the new PCB design. These challenges can cause PCB design to be a laborious and painstaking task.

Some examples described herein provide a processor-based system that provides a design tool that is operable to access one or more files of layout templates, to list the layout templates, and to permit the user to select and insert any of the layout templates in a PCB design. This functionality that is included in the processor-based system by the design tool overcomes the challenges described above. Providing access to the layout templates provides a known-good starting point for modular portions of the PCB design, which can greatly simplify the PCB design process.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations.

FIG. 1 is a block diagram depicting an example of a design system 100 according to some examples. The design system 100 (e.g., a processor-based system) can be used by a user to create a PCB design that can be used to manufacture a PCB, for example. The design system 100 includes a computer 102 coupled to input/output (IO) devices 116 and a display 118. The computer 102 includes a hardware platform 104 that can include components of a computing device, such as a central processing unit (CPU) 106 (or any other circuit that can implement a processor, such as a field programmable gate array configured to be a processor or an application specific integrated circuit), system memory 108, storage 110, various support circuits 112, and an IO interface 114. The CPU 106 can include one or more microprocessors. The CPU 106 is configured to execute program instruction code that performs one or more operations described herein. The program instruction code can be stored in system memory 108, storage 110, or any other memory in the hardware platform 104 (e.g., cache memory). The system memory 108 includes one or more non-transitory storage mediums that store information and can include, for example, RAM, ROM, or a combination thereof. The storage 110 includes one or more local non-transitory storage mediums, such as hard disks, flash memory modules, solid state disks, optical disks, and the like. The storage 110 can also include interface(s) configured for communication with one or more network data storage systems. The support circuits 112 can include cache, power supplies, clock circuits, data registers, IO interfaces, and the like. The 10 interface 114 includes interfaces to/from the computer 102. The 10 interface 114 can be coupled to the 10 devices 116, which can include a keyboard, mouse, and the like. The 10 interface 114 can also be coupled to the display 118, which can present a graphical user interface (GUI) 120 to a user.

The computer 102 further includes a software platform comprising an operating system (OS) 122 and a design tool 124. The OS 122 and the design tool 124 include program instruction code that is executed by the CPU 106, which program instruction code can be stored in system memory 108, storage 110, or any other memory. The OS 122 can include any known operating system, such as Linux®, Microsoft Windows®, Mac OS®, and the like. The design tool 124 is an application that executes within the OS 122, which provides an interface to the hardware platform 104. Some operation of the design tool 124 is described below.

Figure 2:
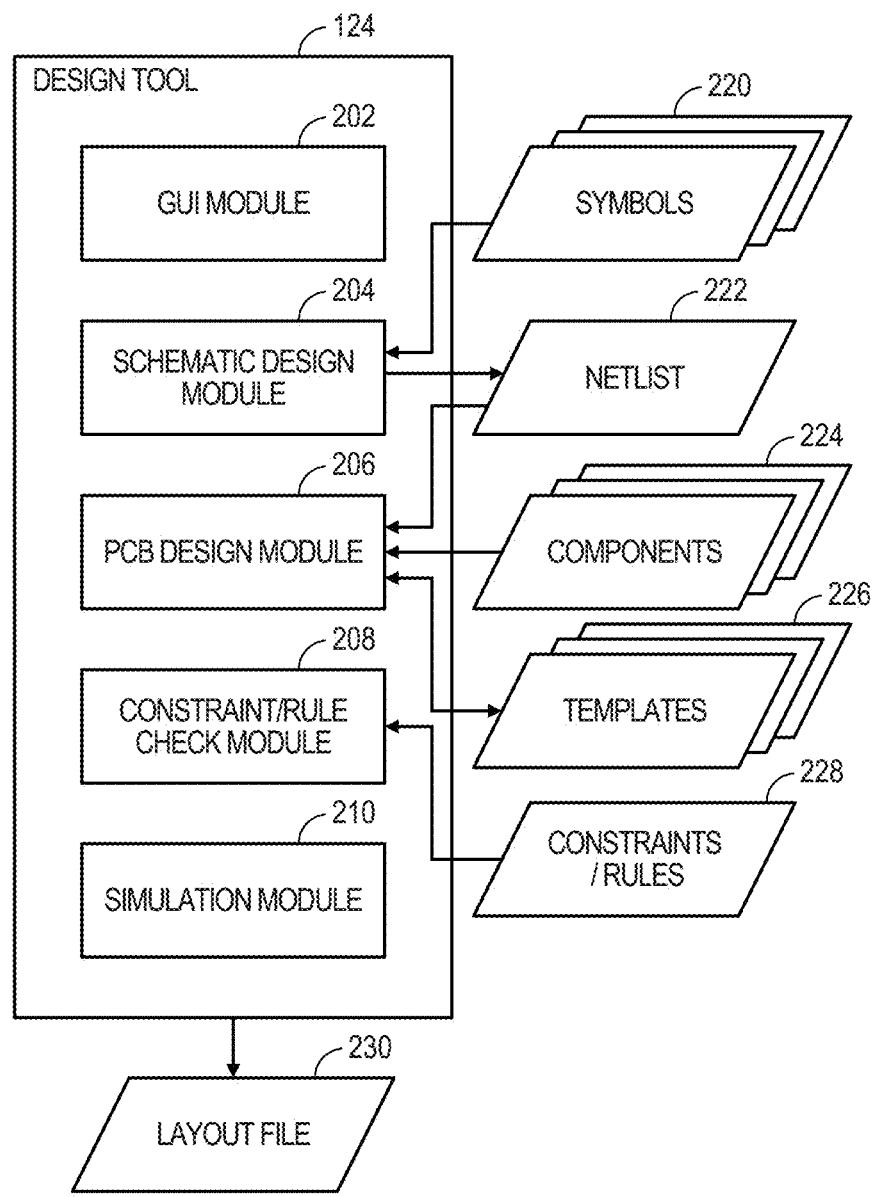
FIG. 2 is a block diagram depicting a design tool capable of being implemented on the design system of FIG. 1 according to some examples.

FIG. 2 is a block diagram depicting a design tool 124 capable of being implemented on the design system 100 of FIG. 1 according to some examples. The design tool 124 includes a GUI module 202, a schematic design module 204, a PCB design module 206, a constraint and rule check module 208, and a simulation module 210. The GUI module 202 provides an interface via the display 118 and GUI 120 for a user to interact with other modules. The GUI module 202 can be or include any representation that permits a user to enter into or use any module of the design tool 124, for example.

The schematic design module 204 permits a user to create a circuit schematic that is to be implemented using a PCB that is to be designed. The schematic design module 204 may access symbol files 220 that include symbols of various circuit components. The symbols can generally be black boxes that have the functionality and connectivity of the circuit component that the respective symbol represents. The symbols of the circuit components may be inserted into a circuit design using the schematic design module 204. The schematic design module 204 may provide the user a schematic workspace via the GUI module 202 in which the user may import or, possibly, create, symbols and connect the symbols to create a circuit schematic. Once the circuit schematic is created, the schematic design module 204 is capable of creating a netlist file 222 of the circuit schematic.

The PCB design module 206 is capable of reading in the netlist file 222 to a layout workspace in which a user can create a PCB layout via the GUI module 202. Reading in the netlist file 222 can create a "rat's nest" in the layout workspace in which nets are connected by arbitrary lines. The PCB design module 206 can identify components indicated in the netlist file 222 and corresponding layout components in layout component files 224 and can insert the layout components from the layout component files 224 into the layout workspace during the reading in of the netlist file 222. The layout components (which can also be referred to as layout decals) can be or, for example, consist of, connection footprints to which the respective components connect on a PCB. For example, a layout component can be an arrangement of contact pads for a surface-mount component, or can be an arrangement of through-vias for through-via mount components. The connections for each layout component that is inserted by the read-in can be connected as indicated by the nets of the netlist file 222 using the arbitrary lines to create the "rat's nest." The read-in provides a starting point for the user in which the nets are visually connected so the user can more easily orient the layout components and route metal lines for each net in the PCB layout.

In some examples, the schematic design module 204 and the reading-in by the PCB design module 206 can be omitted. In such examples, a user may create a PCB layout in a layout workspace without utilizing any previous assistance, such as from the reading-in.

The PCB design module 206 is configured to permit a user to create a PCB layout in the layout workspace via the GUI module 202. Using the PCB design module 206 and GUI module 202, the user can utilize a "rat's nest" that was created by a netlist file read-in and/or can insert into the layout workspace layout templates from layout template files 226 and/or layout components from layout component files 224. Each layout template in a layout template file 226 is a tile layout that includes a layout component of a corresponding component and metal lines in any layer of the PCB layout that extend to the edge of the tile for connecting the layout component with other components on the PCB layout. Each layout template in a layout template file 226 can further include within the tile layout any vias, ground planes, etc. in any layer of the PCB layout. The layout templates comply with applicable design rules for a PCB layout, such as placement of ground planes, grounding vias, metal line widths and spacing, metal line impedances, etc. without a user intervening to ensure compliance with the design rules. In some examples, the PCB design module imports the layout templates from the layout template files 226 and populates a list of available layout templates that is provided to the user via the GUI module 202.

A user using the PCB design module 206 and GUI module 202 can select from the list of layout templates and insert various layout templates into the layout workspace for the PCB design. In some simple scenarios, the user may merely stitch together metal lines or connections between the layout templates (e.g., last mil stitching) to achieve an operable PCB layout that complies with the applicable design rules for the PCB layout. In other scenarios, a user may insert different layout components and/or perform more substantial routing of metal lines or other design tasks to achieve an operable PCB layout.

A user may be permitted to edit or change any layout template of the layout template files 226 before (e.g., in a sandbox workspace, as described below) and/or after insertion into the layout workspace. For example, some metal lines or ground planes may need to be on a different layer to accommodate some other component or layout of the PCB. The layout template provides a known-good starting point for the user, which can simplify the design efforts of the user.

The constraint and rule check module 208 is operable to access a constraints and rules file 228 and compare the PCB design against the constraints and rules contained in the constraints and rules file 228. Any non-compliance with the rules and constraints can be presented to the user via the GUI module 202 (e.g., by a text box), and the user may responsively modify the PCB layout.

The simulation module 210 is operable to simulate operation of the circuit that includes a PCB fabricated according to the PCB design. The simulation module 210 can generate waveforms of signals on various nets on the PCB layout, which can be presented to the user via the GUI module 202.

The simulation module 210 can permit a user to determine whether, e.g., latency of signals caused by the PCB layout is acceptable for the circuit design. The user may responsively modify the PCB layout if the simulation by the simulation module 210 indicates any problems or errors in the PCB design.

The design tool 124 is capable of outputting and storing in memory a layout file 230 of the created PCB design. The layout file 230 can be used by a PCB fabricator to manufacture a PCB according to the PCB design of the layout file 230. The layout file 230 can be a Gerber file. The layout file 230 can be a single flat file that includes one or more layout templates, which may be modified in the layout file 230. One or more PCBs can be manufactured according to the layout file 230.

Figure 3:
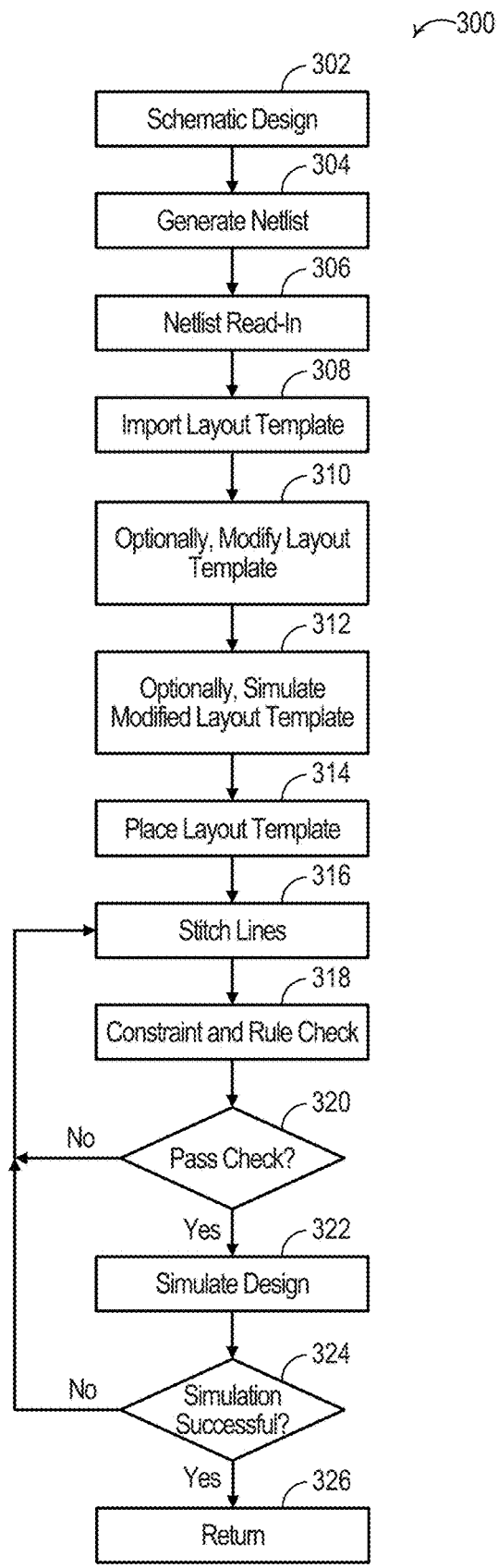
FIG. 3 is a flowchart of a method for printed circuit board (PCB) design according to some examples.

FIG. 3 is a flowchart of a method 300 for PCB design according to some examples. In block 302, schematic design is performed to create a circuit schematic. A user can create a circuit schematic using the schematic design module 204 via the GUI module 202 as described above. In block 304, a netlist file is generated from the circuit schematic. The schematic design module 204 can generate the netlist file as described above. In block 306, netlist read-in performed. The PCB design module 206 can create a layout workspace for creating a PCB design and can read-in the netlist file to create a "rat's nest" in the layout workspace as described above.

In block 308, layout templates are imported. The schematic design module 204 can import the layout templates from layout template files 226 and generate, for presentation to a user via the GUI module 202, a list of available layout templates from the layout template files 226. In block 310, optionally, any layout template can be modified, and in block 312, any modified layout template can be simulated. In block 314, a layout template is inserted and placed in a layout workspace for creating a PCB design. The layout template may be inserted into the layout workspace by selecting the layout template from the list presented to the user by the GUI module 202.

If blocks 310 and 312 are both performed, the placement of the layout template in block 314 may be performed before or after the simulation of block 312, for example. In some examples, a layout template can be inserted and placed in the layout workspace for the PCB layout and then modified and simulated in that layout workspace. In other examples, a layout template can be selected from the list presented to the user and inserted into a sandbox workspace separate and independent from the layout workspace for the PCB layout. In some examples, the sandbox workspace is a trial system board layout placeholder for an initial design. The layout template can be modified and simulated in the separate sandbox workspace, and can subsequently be inserted from the separate sandbox workspace into the layout workspace for the PCB layout. This can provide sandboxing for modifying and simulating the layout template separate from the remainder of the PCB layout.

With layout templates placed, in block 316, metal lines are stitched (e.g., last mil stitching) between the layout templates. The stitching can be performed by the user with the PCB design module 206 via the GUI module 202. In some examples, in addition to the stitching, additional design of the PCB layout may be performed. In block 318, a constraint and rule check is performed on the PCB layout. In block 320, a determination is made whether the PCB layout passed the constraint and rule check of block 318. If the determination of block 320 is that the PCB layout did not pass the constraint and rule check of block 318, the stitching of block 316 can be performed again to modify the PCB layout. If the determination of block 320 is that the PCB layout passed the constraint and rule check of block 318, in block 322, the design that includes a PCB according to the PCB layout is simulated. In block 324, a determination is made whether the simulation of block 322 was successful. If the determination of block 324 is that the simulation of block 322 was not successful, the stitching of block 316 can be performed again to modify the PCB layout. If the determination of block 324 is that the simulation of block 322 was successful, in block 326, the method 300 returns.

The constraint and rule check can be performed by the constraint and rule check module 208, and the simulation can be performed by the simulation module 210, as described above. If the constraint and rule check or simulation results in any error or failure, the stitching of block 316 can be performed again to modify the PCB layout. The stitching of block 316, constraint and rule check of block 318, and simulation of block 322 can be iteratively performed until the PCB design passes the check and simulation, for example.

Figure 4:
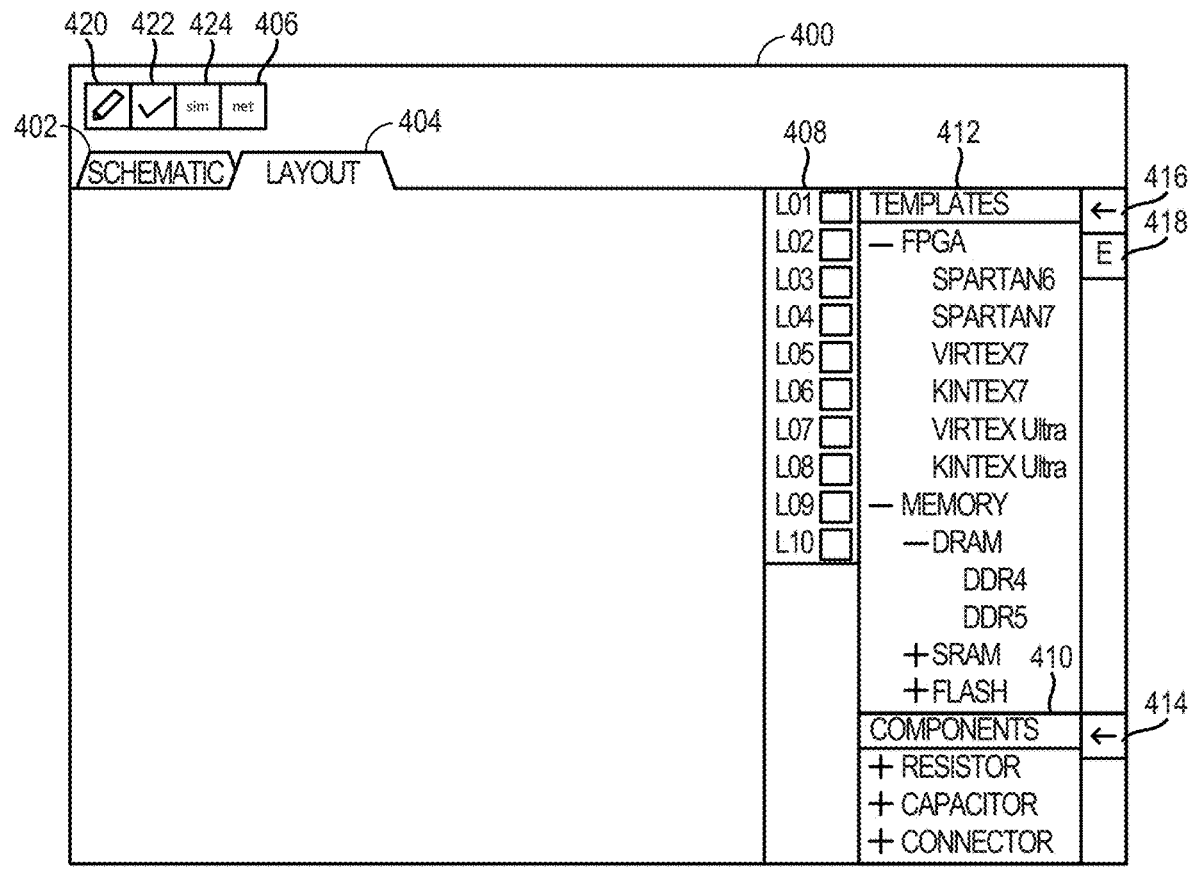
FIG. 4 is an example user interface of the design tool of FIG. 2 according to some examples.

FIG. 4 is an example user interface 400 of the design tool 124 presented via the GUI module 202 and GUI 120 according to some examples. The user interface 400 includes a schematic workspace 402 and a layout workspace 404. A user may selectively transition between the schematic workspace 402 and the layout workspace 404 by tabs corresponding to each of the schematic workspace 402 and layout workspace 404 in the user interface 400.

When the schematic workspace 402 is selected, a user can access the schematic design module 204 to create a circuit schematic. The presentation in the user interface 400 may differ from what is shown in FIG. 4 when the schematic workspace 402 is selected. For example, the user interface 400 may present a list of circuit components that the user may insert into the schematic workspace 402 to create the circuit schematic. The schematic design module can access the layout component files 224 to populate the list of circuit components that is presented via the user interface 400. Additionally, when the schematic workspace 402 is selected, the user interface 400 may provide functionality, such as through a radio button and input device (e.g., a mouse), to connect the circuit components to create the circuit schematic. Further, when the schematic workspace 402 is selected, the user interface 400 provides functionality, such a through a radio button, to generate a netlist file based on the circuit schematic in the schematic workspace 402. In some examples, the generation of a netlist file by the schematic design module 204 triggers the PCB design module 206 to read-in the netlist file into the layout workspace 404. A "rat's nest" created by the read-in is populated in the layout workspace 404.

The user interface 400 may provide functionality of the PCB design module 206 to read-in a netlist file that was not created via the schematic workspace 402. For example, the netlist file could be created by a different tool, and the schematic workspace 402 and associated functionality could be omitted. As shown in FIG. 4, when the layout workspace 404 is selected, the user interface 400 presents a net radio button 406 that can be selected by the user via an input device (e.g., by clicking on the net radio button 406 with a mouse). Selecting the net radio button 406 prompts the user to navigate through a directory to a netlist file stored in the directory, and when the user selects the netlist file, the PCB design module 206 reads-in the netlist file into the layout workspace 404. The user interface 400 may also permit a user to create a PCB layout using the layout workspace 404 without reading-in a netlist file.

When the layout workspace 404 is selected, as shown in FIG. 4, the user interface 400 presents a layer selection list 408, a layout component list 410, and a layout template list 412. Layers are presented in the layer selection list 408 that correspond to the layers to be manufactured in a PCB according to the PCB design. The PCB, and correspondingly the PCB design, can therefore comprise multiple layers. The user may select any individual layer or combination of layers to be presented in the layout workspace 404 by selecting such layers in the layer selection list 408. The presentation of multiple layers in the layout workspace 404 can overlay the layers as those layers would be fabricated on a PCB. In the illustration, layer 1 (L01) through layer 10 (L10) are shown in the layer selection list 408, although any number of layers may be shown in the layer selection list 408 and fabricated in a PCB.

The layout component list 410 is a list that includes available layout components that can be inserted into the layout workspace 404 for use in a PCB layout. When the layout workspace 404 is selected, the PCB design module 206 can import layout component files 224 and populate the layout component list 410 based on the imported layout component files 224. The layout component list 410 illustrated in FIG. 4 includes a hierarchical and expandable list of available layout components. A user can navigate the layout component list 410 by expanding any classification in the hierarchy until the layout component to be inserted is located. For example, if a layout component for a specific resistor is to be inserted, the user can expand "RESISTOR" to locate the layout component for the specific resistor. Expanding or collapsing any level in the hierarchy of the list may be performed by a user selecting or clicking on the "+" or "−", respectively, using an input device (e.g., a mouse). Once located, a layout component can be inserted into the layout workspace 404 by selecting (e.g., highlighting) the layout component in the layout component list 410 and selecting an insert radio button 414 using an input device (e.g., a mouse). Additionally or alternatively, the layout component can be inserted into the layout workspace 404 by dragging and dropping the layout component from the layout component list 410 into the layout workspace 404 using an input device (e.g., a mouse). Other mechanisms may be implemented for inserting a layout component into the layout workspace 404. For example, a layout component may be selected from a drop-down menu presented in the user interface 400, which causes the layout component to be inserted into the layout workspace 404. Once a layout component is inserted into the layout workspace 404, the user can move and/or delete the layout component in the layout workspace 404. For example, using a mouse as an input device, the user can hover a pointer over the layout component, hold down a mouse button to select the layout component, and, while holding down the button, drag the layout component to a target location in the layout workspace 404 where the button is released to re-locate the layout component.

In some examples, the layout component list 410 can be omitted. For example, if a netlist is read in, layout components may be inserted into the layout workspace 404 automatically by the PCB design module 206 (e.g., in creating the "rat's nest"). Additionally, for example, each layout component may be included in a layout template such that listing the layout components separately would be redundant.

The layout template list 412 is a list that includes available layout templates that can be inserted into the layout workspace 404 for use in a PCB layout. When the layout workspace 404 is selected, the PCB design module 206 can import layout template files 226 and populate the layout template list 412 based on the imported layout template files 226. The layout template list 412 illustrated in FIG. 4 includes a hierarchical and expandable list of available layout templates. A user can navigate the layout template list 412 by expanding any classification in the hierarchy until the layout template to be inserted is located. For example, if a layout template for a fourth generation double data rate (DDR4) dynamic access memory (DRAM) is to be inserted, the user can expand "MEMORY" and "DRAM" to locate the layout template for DDR4. Expanding or collapsing any level in the hierarchy of the list may be performed by a user selecting or clicking on the "+" or "-", respectively, using an input device (e.g., a mouse). Once located, a layout template can be inserted into the layout workspace 404 by selecting (e.g., highlighting) the layout template in the layout template list 412 and selecting an insert radio button 416 using an input device (e.g., a mouse). Additionally or alternatively, the layout template can be inserted into the layout workspace 404 by dragging and dropping the layout template from the layout template list 412 into the layout workspace 404 using an input device (e.g., a mouse). Other mechanisms may be implemented for inserting a layout template into the layout workspace 404. For example, a layout template may be selected from a drop-down menu presented in the user interface 400, which causes the layout template to be inserted into the layout workspace 404.

In some examples, a layout component can be in the layout workspace 404 and can be replaced by a corresponding layout template (e.g., a layout component in a "rat's nest" is to be replaced by a layout template). For example, a layout component can be selected in the layout workspace 404, such as by clicking on the layout component with a mouse, and in response, a layout template in the layout template list 412 corresponding to the layout component can be highlighted. In some examples, the layout template list 412 may automatically navigate to the corresponding layout template in the layout template list 412 (e.g., by expanding and/or collapsing the hierarchy). With the layout component selected and the layout template selected, the user may select the insert radio button 416 to insert the layout template in the layout workspace 404 and replace the layout component. The PCB design module 206 may connect any metal lines or arbitrary lines (e.g., in a "rat's nest") of nets to corresponding nodes at the edge of the layout component. In some examples, a layout component can be selected, e.g., by right-clicking the layout component with a mouse, and a drop-down menu that list a function to replace the layout component with a layout template can be presented to the user. The drop-down menu can present any corresponding layout template or may direct the user to another list, such as the layout template list 412, where the user can select a corresponding layout template. Once the layout template is selected, the PCB design module 206 inserts the layout template in the place of the layout component and may connect any metal lines or arbitrary lines (e.g., in a "rat's nest") of nets to corresponding nodes at the edge of the layout component.

In some examples, when a layout template is selected (e.g., by clicking using a mouse) in the layout template list 412, the selected layout template can be edited or modified before being inserted into the layout workspace 404. For example, by selecting a layout template and selecting an edit radio button 418, a new sandbox layout workspace can be created in the user interface 400 that contains the selected layout template. The layout template can be edited, modified, tested, and/or simulated, such as described below, in an isolated environment of the sandbox layout workspace before being inserted in the layout workspace 404 with any other portion of the design. After being edited or modified, the layout template can be inserted into the layout workspace 404 using the insert radio button 416, for example.

A layout template that is in the layout workspace 404 or another workspace (e.g., sandbox layout workspace) can be moved, edited, and/or deleted in the layout workspace 404 or other workspace. For example, using a mouse as an input device, the user can hover a pointer over the layout template, hold down a mouse button to select the layout template, and, while holding down the button, drag the layout template to a target location in the layout workspace 404 where the button is released to re-locate the layout template. The user interface 400 can provide editing capabilities. A line drawing radio button 420 is illustrated and permits a user to draw metal lines on a layer in the layout workspace 404. Other editing capabilities can be included in the user interface 400, such as functionality to push or pull any element to or from one layer to another, etc. In a simplest scenario, a user could insert various layout templates from the layout template list 412 and connect nets by drawing metal lines to stitch the nets of the layout templates together.

The user interface 400 includes a rule check radio button 422. A user can select the rule check radio button 422 to initiate the constraint and rule check module 208 to parse the PCB design in the layout workspace 404 and check the PCB design against constraints and rules in the constraints and rules file 228. Any errors and/or failures of the PCB design can be listed in, e.g., a text box in the user interface 400. Other mechanisms for initiating and/or implementing a constraint and rule check can be used.

The user interface 400 also includes simulation functionality that can be initiated by a simulation radio button 424. A user can select the simulation radio button 424 to initiate the simulation module 210 to simulate the PCB design in the layout workspace 404. The simulation module 210 can generate signals of nets of the PCB design and can display in the user interface 400 various ones of the signals of the nets. The user can select which signals are to be displayed by, e.g., clicking on the corresponding nets in the layout workspace 404.

The user can continue to edit or modify the PCB design in the layout workspace based upon any results of the constraint and rule check and/or simulation. The user can iteratively edit/modify and check/simulate the PCB design.

The PCB design can be saved as a file, such as a Gerber file. The file can be a single flat file that includes one or more layout templates, which may be modified in the file. One or more PCBs can be manufactured according to the file.

Figure 5:
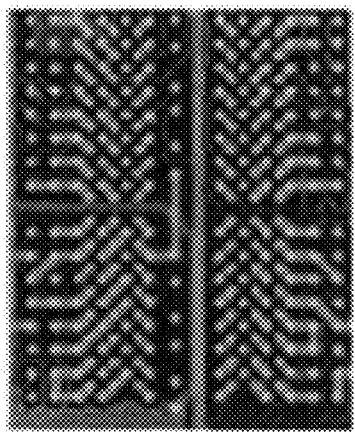
FIGS. 5 and 6 are layout templates according to some examples.
Figure 6:
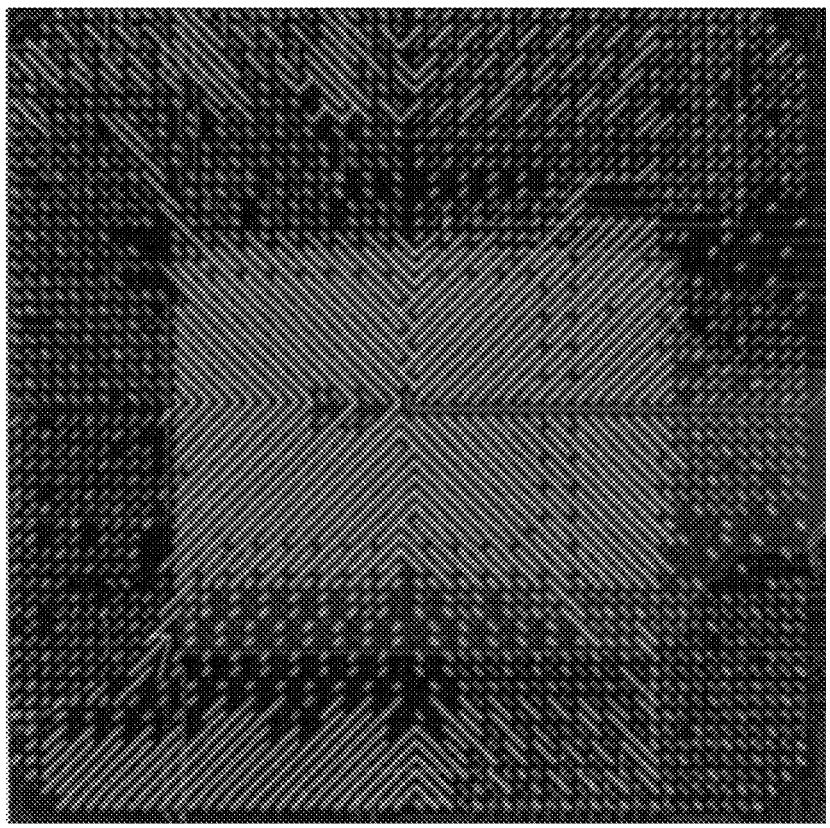

FIGS. 5 and 6 illustrate layout templates according to some examples. FIG. 5 is a layout template of DDR4 memory IC, and FIG. 6 is a layout template of a field programmable gate array (FPGA) IC. Each of the layout templates include, e.g., solder ball contact pads (e.g., the layout component) to which the respective ICs are connected, and vias and metal lines through or in various layers (which are overlaid in FIG. 5 or 6), at least some of which are electrically connected to the contact pads. Additionally, the layout templates include ground vias, ground planes, and power planes in various layers. Each of the layout templates complies with applicable design rules. For example, the width of each metal line and pitches between metal lines comply with design rules, e.g., to be within a target parasitic impedance. As a further example, ground vias with appropriate spacing are in the layout templates to comply with applicable design rules. A user can modify the layout templates, and by starting with layout templates that comply with design rules, verification of the modified design can be made simpler. If the layout templates of FIGS. 5 and 6 are inserted into a PCB design, appropriate nets can be stitched together with minimal effort to create a functional PCB in some examples.

As will be appreciated by one having ordinary skill in the art, some examples disclosed herein may be embodied as a system, method, or computer program product. Accordingly, aspects may take the form of an entirely hardware embodiment, an entirely software embodiment (including firmware, resident software, micro-code, etc.), or a combination of software and hardware aspects. Furthermore, aspects may take the form of a computer program product embodied in one or more non-transitory computer readable storage medium(s) having computer readable program instruction code embodied thereon. A computer readable storage medium may be or include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Computer program instruction code for carrying out operations for aspects described herein may be written in any combination of one or more programming languages, including an object oriented programming language such as Java, Smalltalk, C++ or the like and conventional procedural programming languages, such as the C programming language or similar programming languages. The program instruction code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various examples have been described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instruction code. These computer program instruction code may be provided to a processor of a general purpose computer, special purpose computer, or other programmable data processing apparatus to produce a machine, such that the program instruction code, which execute via the processor of the computer or other programmable data processing apparatus, create means for implementing the functions/acts specified in the flowchart and/or block diagram block or blocks.

These computer program instruction code may also be stored in a computer readable medium that can direct a computer, other programmable data processing apparatus, or other devices to function in a particular manner, such that the program instruction code stored in the computer readable medium produce an article of manufacture including program instruction code which implement the function/act specified in the flowchart and/or block diagram block or blocks.

The computer program instruction code may also be loaded onto a computer, other programmable data processing apparatus, or other devices to cause a series of operational steps to be performed on the computer, other programmable apparatus or other devices to produce a computer implemented process such that the program instruction code which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various examples. In this regard, each block in the flowchart or block diagrams may represent a module, segment, or portion of program instruction code, which comprises one or more executable program instruction code for implementing the specified logical function(s). In some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer program instruction code.

While the foregoing is directed to specific examples, other and further examples may be devised without departing from the basic scope thereof, and the scope thereof is determined by the claims that follow.

What is claimed is:

1. A design system comprising:
   a processor; and
   a memory coupled to the processor, the memory storing instruction code, the processor being configured to execute the instruction code to:
   provide a workspace in a user interface in which a printed circuit board (PCB) design comprising multiple layers is capable of being created;
   provide a list of layout templates in the user interface, each layout template of the list of layout templates being a tile layout that includes a layout component and metal lines that extend to one or more edges of the tile layout; and
   provide, via the user interface, an insert function configured to insert a selected layout template of the list of layout templates into the workspace to be included in the PCB design.

2. The design system of claim 1, wherein the processor is further configured to execute the instruction code to provide, in the user interface, a sandbox workspace in which a selected layout template of the list of layout templates is capable of being modified.

3. The design system of claim 2, wherein the processor is further configured to execute the instruction code to simulate a modified layout template in the sandbox workspace.

4. The design system of claim 1, wherein each layout template of the list of layout templates includes a corresponding portion for each layer of the multiple layers.

5. The design system of claim 1, wherein each layout template of the list of layout templates complies with design rules of the PCB design.

6. The design system of claim 1, wherein the insert function is represented in the user interface by a radio button.

7. The design system of claim 1, wherein the processor is further configured to execute the instruction code to store the PCB design of the workspace in a flat file.

8. The design system of claim 1, wherein the processor is further configured to execute the instruction code to provide a list of layout components in the user interface.

9. A design system comprising:
a processor; and
a memory coupled to the processor, the memory storing instruction code, the processor being configured to execute the instruction code to:
execute a graphical user interface module; and
execute a printed circuit board (PCB) design module, the PCB design module being operable to access at least one layout template file and to display, via the graphical user interface module, a list comprising at least one layout template corresponding to the at least one layout template file, each layout template of the list being a tile layout that includes a layout component and metal lines that extend to one or more edges of the tile layout, a selected layout template of the list being capable of being inserted by operation of the PCB design module in a workspace provided by the PCB design module via the graphical user interface module, a PCB design being capable of being created in the workspace using the PCB design module.

10. The design system of claim 9, wherein the processor is further configured to execute the instruction code to execute a schematic design module, a circuit schematic capable of being created using the schematic design module, the schematic design module being operable to generate a netlist from the circuit schematic, and the PCB design module being operable to read-in the netlist into the workspace.

11. The design system of claim 9, wherein the processor is further configured to execute the instruction code to execute a constraint and rule check module, the constraint and rule check module being operable to access a file including a rule, a constraint, or a combination thereof, the constraint and rule check module further being operable to check the PCB design based on the file.

12. The design system of claim 9, wherein the processor is further configured to execute the instruction code to execute a simulation module, the simulation module being operable to simulate operation of the PCB design.

13. The design system of claim 9, wherein the processor is further configured to execute the instruction code to generate a file of the PCB design.

14. The design system of claim 9, wherein each layout template of the list includes a corresponding portion for each layer of multiple layers of the PCB design and complies with design rules of the PCB design.

15. The design system of claim 9, wherein the PCB design module is operable to display a sandbox workspace, a selected layout template of the list being capable of being modified, by operation of the PCB design module, in the sandbox workspace and inserted in the workspace provided by the PCB design module via the graphical user interface module.

16. A method for creating a printed circuit board (PCB) layout, the method comprising:
using a processor-based system:
creating a layout workspace to create the PCB layout of a PCB;
accessing layout template files, each layout template file of the layout template files comprising a layout template, each layout template being a tile layout that includes a layout component and metal lines that extend to one or more edges of the tile layout;
generating a list of layout templates contained in the layout template files; and
inserting a selected layout template from the list of layout templates into the layout workspace.

17. The method of claim 16 further comprising, using the processor-based system, creating a sandbox workspace to modify the selected layout template prior to inserting the selected layout template into the layout workspace.

18. The method of claim 16, wherein each layout template includes a corresponding portion for each layer of multiple layers of the PCB.

19. The method of claim 16, wherein each layout template of the list of layout templates complies with design rules of the PCB layout.

20. The method of claim 16 further comprising:
using the processor-based system:
creating a schematic workspace to create a circuit schematic;
generating a netlist file from the circuit schematic;
reading in the netlist file to the layout workspace;
stitching metal lines to at least one edge of the one or more edges of the tile layout of the selected layout template;
checking the PCB layout for compliance with a constraint, a rule, or a combination thereof; and
simulating the PCB layout.

* * * * *